July 24, 1956
F. H. KAYLER
2,756,074
TRACTOR FIFTH WHEEL CONSTRUCTION
FOR COUPLING SEMI-TRAILERS
Filed March 9, 1953
4 Sheets-Sheet 1
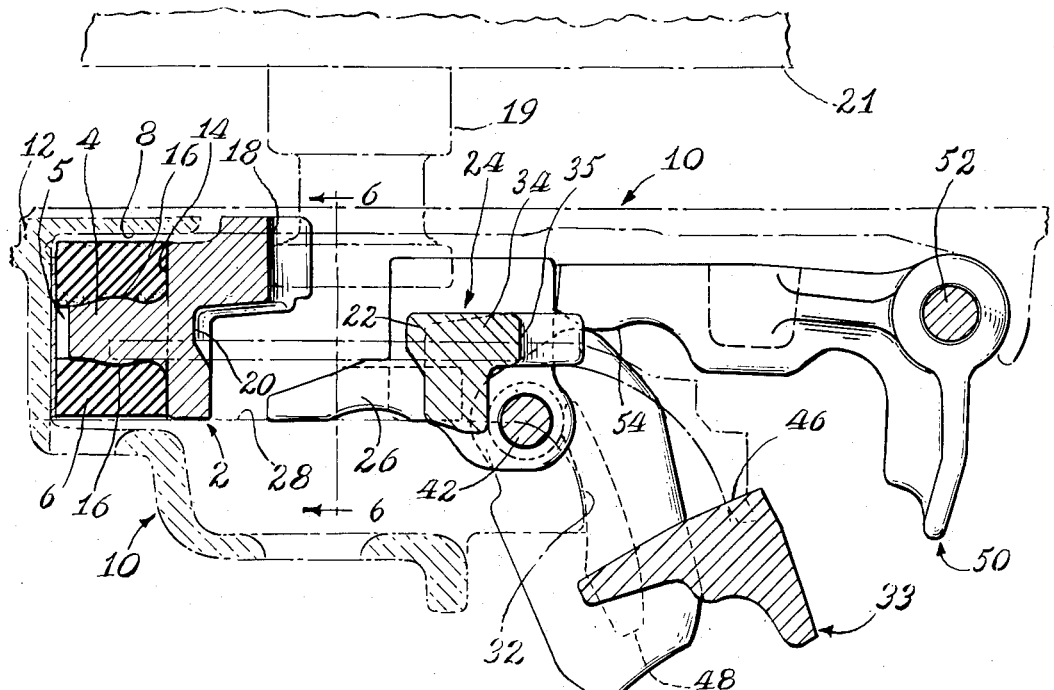
Fig. 1.
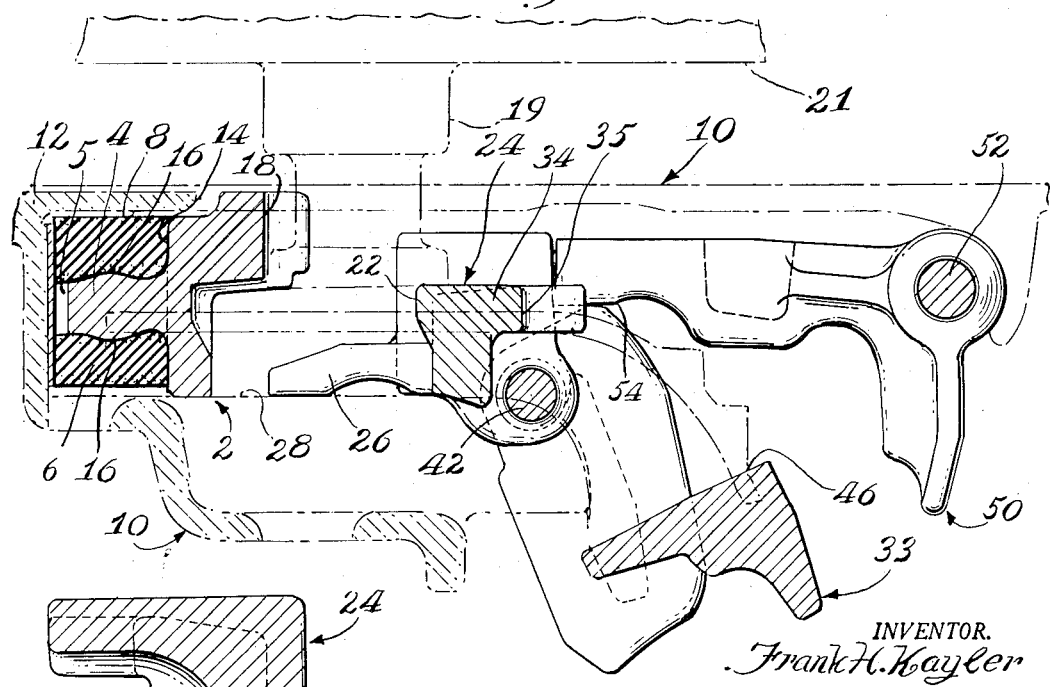
Fig. 14.
Fig. 2.
INVENTOR.
Frank H. Kayler
BY
O. B. (signature)
Attorney July 24, 1956

F. H. KAYLER 2,756,074

TRACTOR FIFTH WHEEL CONSTRUCTION
FOR COUPLING SEMI-TRAILERS

Filed March 9, 1953

INVENTOR.
Frank H. Kayler
BY O. B. Garner
Attorney

July 24, 1956     F. H. KAYLER     2,756,074
TRACTOR FIFTH WHEEL CONSTRUCTION
FOR COUPLING SEMI-TRAILERS Filed March 9, 1953     4 Sheets-Sheet 3

INVENTOR.
Frank H. Kayler
BY
Erwin O. B. Garner
Attorney

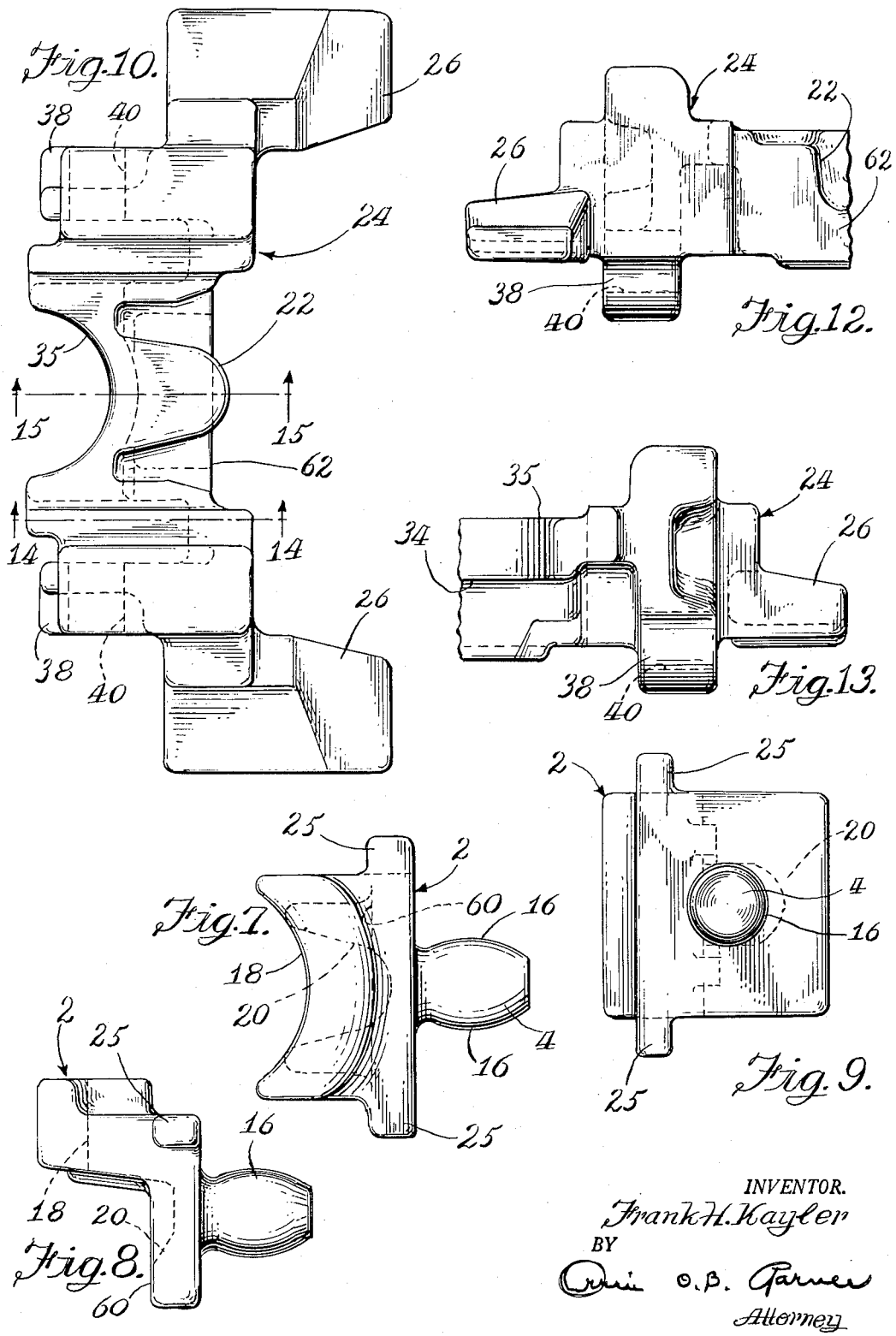

United States Patent Office 2,756,074
Patented July 24, 1956

2,756,074

TRACTOR FIFTH WHEEL CONSTRUCTION FOR COUPLING SEMI-TRAILERS

Frank H. Kayler, Alliance, Ohio, assignor to American Steel Foundries, Chicago, Ill., a corporation of New Jersey Application March 9, 1953, Serial No. 341,050

20 Claims. (Cl. 280—437)

This invention relates to fifth wheel mechanisms such as are commonly used in the coupling of tractors and trailers, and the invention relates more particularly to a novel fifth wheel coupling mechanism of the type disclosed in my copending application Serial No. 252,350, filed October 20, 1951, now Patent No. 2,640,707.

In coupling mechanisms of this type pivotally interconnected jaws are supported for translatory movement within guide ledges or extensions of the jaws received in complementary guide slots of the fifth wheel which pivot the rear jaw upwardly to closed position as the jaws move forwardly and which accommodate pivotal movement of the rear jaw downwardly to open position as the jaws move rearwardly with respect to the fifth wheel. A lock is customarily pivoted to the fifth wheel for movement downwardly to locked position with respect to the rear jaw when the latter is closed; and in prior art arrangements such as that disclosed in said copending application, the front jaw is engageable with resilient means usually in the form of a rubber block to compress the latter before the lock moves to its locked position behind the rear jaw. Thus, said resilient means is effective to maintain a slack-free condition between the parts of the coupling mechanism when the latter is coupled with a king pin of a vehicle such as a trailer.

In prior art arrangements of this type it has been found that under certain conditions the king pin, in an exceptionable high position, passes fully above a conventional retainer ring of the front jaw, whereupon the bottom of the king pin engages the king pin bearing portion of the front jaw and in coupling as, for example, when backing the tractor under a raised trailer, the king pin under these conditions moves the jaw assembly to locked position with the king pin remaining above the retaining ring of the front jaw. Thus, with the coupling mechanism in fully locked position, indicating to the operator that a proper coupling has been made, the king pin is free to move vertically with respect to the fifth wheel, under which conditions it is possible for bouncing action of the trailer to release the king pin from the fifth wheel.

It has also been found that in prior art arrangements such as that disclosed in said copending application, the king pin, due to misalignment of the tractor and trailer, may not enter the guide slot of the fifth wheel and thus may ride on top of the fifth wheel; and under certain conditions, the king pin may then drop into the fifth wheel king pin slot forwardly of the front jaw. Although the jaws can not be moved to locked position under these circumstances, the king pin is confined between the front jaw and the resilient buffing block so that the king pin may bounce vertically out of engagement with the fifth wheel if the tractor and trailer are operated in this condition.

Accordingly, a primary object of the present invention is to eliminate any possibility of coupling the king pin to the fifth wheel when the king pin is not safely engaged by the fifth wheel coupling mechanism to limit upward movement of the king pin.

Another object of the invention is to prevent the king pin from dropping into the fifth wheel slot forwardly of the jaw assembly.

A further object of the invention is to limit compression of the resilient buffing block under buffing impacts of the king pin against the fifth wheel coupling mechanism.

Still another object of the invention is to devise a novel jaw assembly wherein certain of the parts are readily separable to accommodate replacement or repair.

Yet another object of the invention is to devise an arrangement in which the buffer block resiliently resists upward or twisting movement of the coupled king pin.

The foregoing and other objects and advantages of the invention will become apparent from a consideration of the following specification and the accompanying drawings, wherein:

Figure 1 is a central vertical sectional view through a fifth wheel coupling mechanism embodying the invention, with the mechanism in fully open position and the king pin above the retainer ledge or ring;

Figure 2 is a view similar to Figure 1, with the king pin in a lower position;

Figure 15:
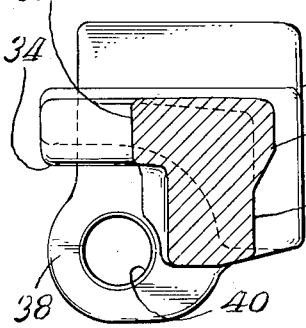
Figure 11:
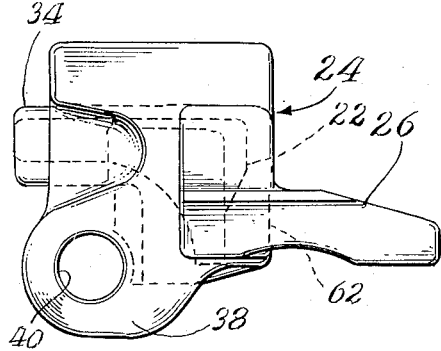

Figures 7 to 9 inclusive illustrate the front king pin bearing block in detail, Figure 7 being a top plan view thereof, Figure 8 being a side elevational view thereof, and Figure 9 being a front elevational view thereof;

Figures 10 to 15 illustrate in detail the intermediate jaw of the coupling mechanism, Figure 10 being a top plan view thereof, Figure 11 being a side elevational view, Figure 12 being a front elevational view taken from the right as seen in Figure 11, Figure 13 being a rear elevational view taken from the left as seen in Figure 11, and Figures 14 and 15 being sectional views on the lines 14—14 and 15—15, respectively, of Figure 10.

Describing the invention in detail and referring first to the general assembly view of Figure 1, the novel coupling mechanism comprises a front king pin bearing block 2 having on the forward face thereof a lug or projection 4 recessed as at 5 in a resilient buffer block 6 which is confined within a pocket 8 of a conventional fifth wheel generally indicated 10, such as that disclosed in my said copending application, said fifth wheel 10 being adapted for mounting in the usual manner on a vehicle such as a tractor.

The block 6 is illustrated as a one-piece unit but, if desired, may be formed of any desired number of spring units. The block 6, as illustrated, engages a front wall 12 of the fifth wheel 10 and engages a spring seat 14 of the front bearing block 2 around the perimeter of its lug 4, which conveniently supports the bearing block 2 from the resilient buffer block 6. It may be noted in this connection that the lug 4 is preferably crowned as at 16, and the corresponding margin of the recess 5 in the buffer block 6 are preferably rectilinear to afford positive restraint against accidental release of the lug 4 from the recess 5 after said lug has been forced into said recess to the assembled position shown in Figure 1.

Figure 3:
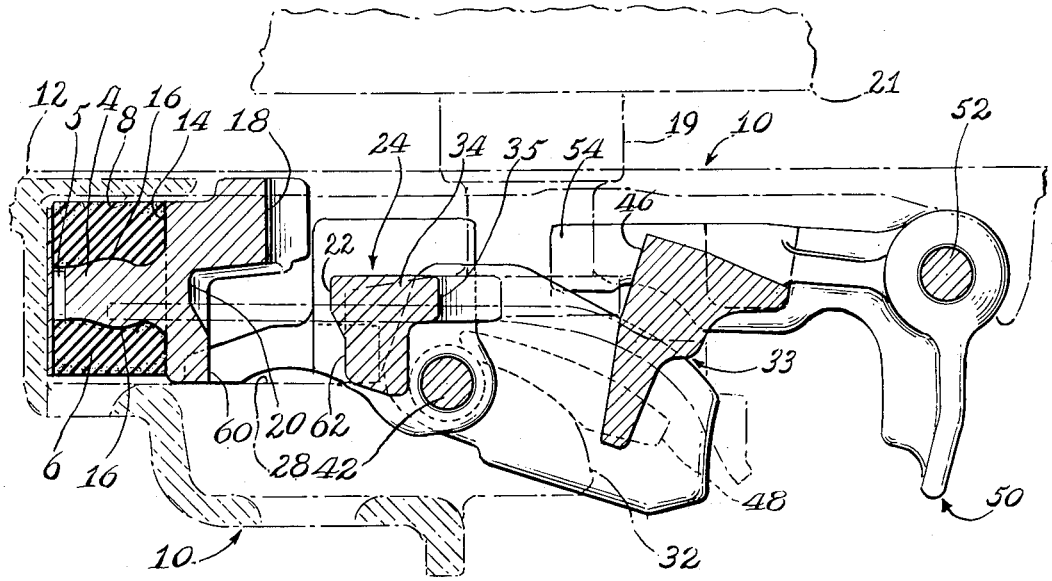
Figure 3 is a view somewhat similar to Figure 1, the lower end of the king pin engaged with the retainer ledge or ring and the coupling mechanism partially closed.

The front bearing block 2 also comprises a rearwardly facing arcuate front king pin jaw or bearing surface 18 to receive an associated king pin 19 of a vehicle such as a trailer fragmentarily indicated at 21 in Figures 1 to 3. The front bearing block 2 is preferably provided below the jaw 18 with a recess or slot 20 which extends forwardly of jaw 18 for reception of a complementary lug 22 of an intermediate jaw generally designated 24 when the king pin is properly coupled as hereinafter described.

Figure 6:
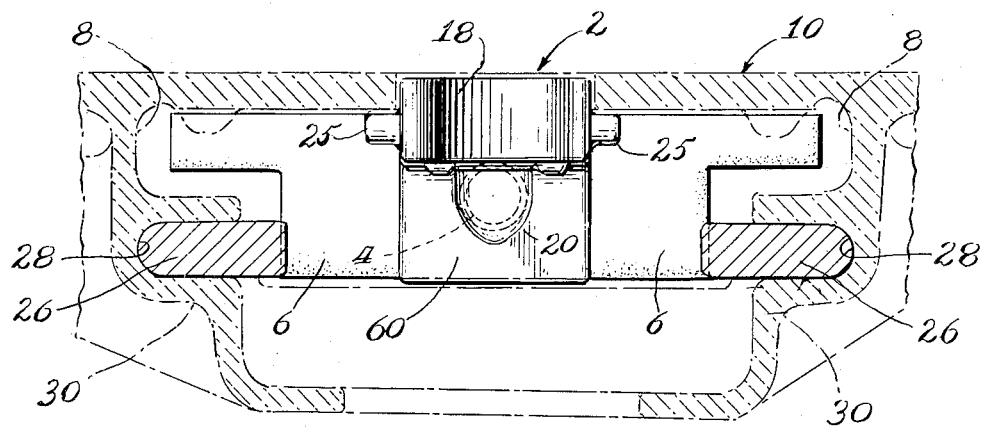
Figure 6 is a fragmentary sectional view on the line 6—6 of Figure 1.

It will be noted that the front bearing block 2 as seen in Figure 6 is also provided with positioning lugs 25 beneath the fifth wheel 10 to restrain rotational movement of the block 2 about the longitudinal axis of its lug 4; and it may also be noted, as best seen in Figure 1, that the lug 4 is engageable with the front wall 12 to limit compression of the resilient buffer block 6 under buffing impacts of the king pin 19. Thus it will be understood that the front bearing block 2 is resiliently restrained against upward and downward movement as well as rotational movement about the longitudinal axis of its lug 4 so that corresponding movements of the king pin when properly coupled, as hereinafter described, are also resiliently resisted.

The intermediate jaw 24 is shown in detail in Figures 10 to 15 and comprises lugs or ledges 26 at opposite sides thereof, each of said ledges, as best seen in Figures 1 to 6, being received within a conventional guide slot 28 of the fifth wheel 10 to support the intermediate jaw 24 along a ledge 30 of the fifth wheel defining the lower margin of the slot 28 which slopes downwardly at its rear extremity in the usual manner as at 32 (Figures 1 to 5) to accommodate opening and closing movement of a rear jaw, generally designated 33, as hereinafter described.

The intermediate jaw 24 comprises a ledge 34 in the form of a segment of a ring having an arcuate pin engaging surface 35 facing rearwardly as best seen in Figures 1 to 5, and said intermediate jaw 24 comprises the before mentioned lug 22 serving a purpose hereinafter described in connection with the operation of the novel coupling. The intermediate jaw 24 also comprises depending lugs 38 as best seen in Figures 11, 13 and 15, said lugs being provided with pin holes 40 for pivotal connection by a pin 42 to a conventional rear jaw 33 such as that disclosed in detail in said copending application.

The rear jaw 33 as above noted is conventional in form and comprises an arcuate pin engaging surface 46 (Figures 1 to 5) and also comprises a ledge 48 at each side thereof received within the related guide slot 28 of the fifth wheel 10 for support by the ledge 30 defining the lower margin of said slot.

Figure 4:
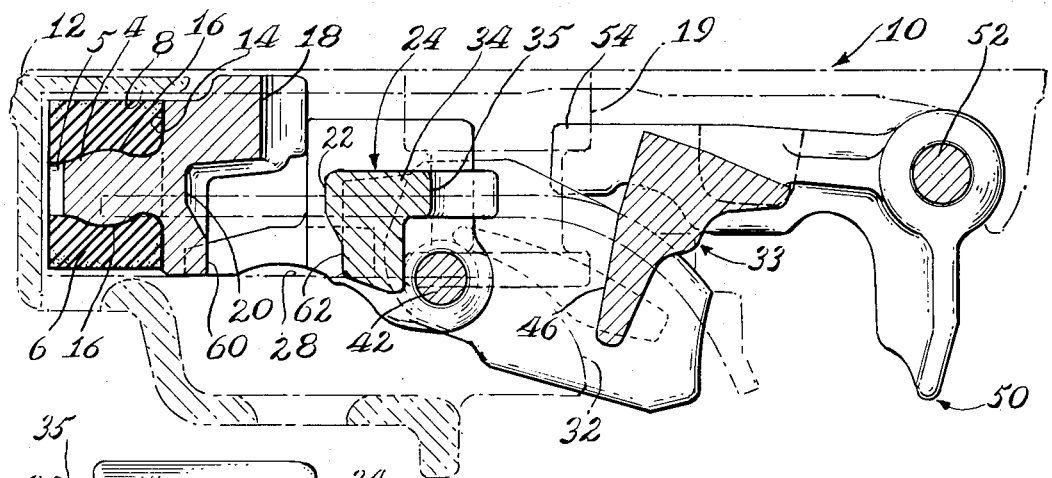
Figure 4 is a view similar to Figure 1 showing the king pin properly engaged with the coupling mechanism and moving forwardly to locked position.

A conventional lock, generally designated 50, is pivoted as at 52 to the fifth wheel 10, said lock being operable either by gravity as illustrated or by conventional spring means such as those disclosed by said copending application. When the rear jaw 33 is in open position as shown in Figures 1 and 2, or in partly open position as shown in Figures 3 and 4, a nose 54 of the lock engages along the top of the rear jaw 33, and when the rear jaw 33 is in the fuly closed position of Figure 5, a forward end of the lock engages the rear surface of the rear jaw 33 as at 56 to hold the coupling mechanism in locked position.

Referring now to Figure 1 which illustrates the king pin 19 in an abnormally high position, it will be understood that an attempt to couple the king pin with the coupling mechanism of the fifth wheel 10 by moving the vehicle to which it is attached rearwardly, merely causes compression of the buffer block 6 and fails to pull the jaws 24 and 33 forwardly so that a partial coupling is impossible.

As shown in Figure 2, the lug 22 of the intermediate jaw 24 positively prevents the king pin 19 from entering the coupling mechanism forwardly of the intermediate jaw 22. For this reason an incomplete coupling is prevented under conditions where the king pin 19 drops from the top of the fifth wheel 2 between the front jaw 18 and the intermediate jaw 24.

Figure 3 illustrates a condition wherein the king pin 19 is at such height that the lower end thereof engages the retaining ledge 34, thereby positively preventing an incomplete coupling under these conditions since the rear jaw 33 as illustrated in this figure cannot close to its locked position.

Figure 5:
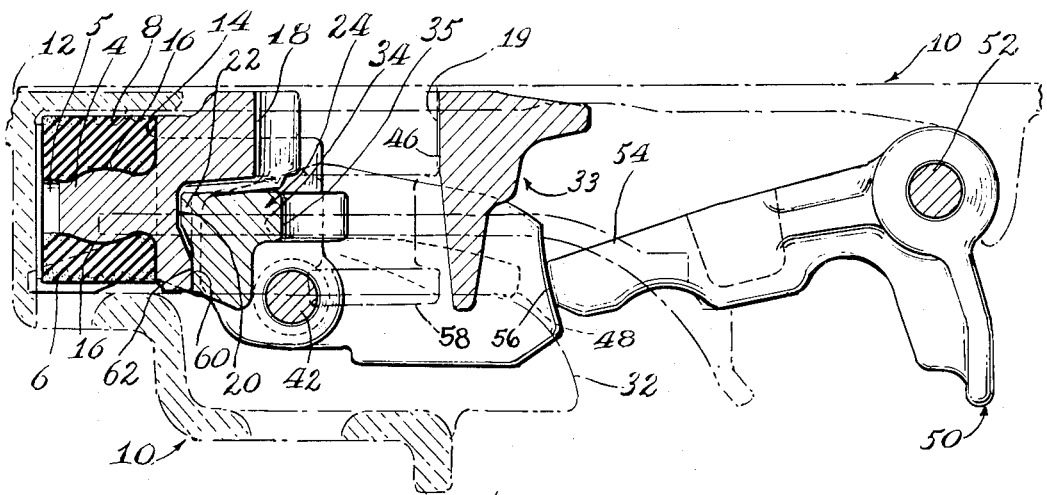
Figure 5 is a view similar to Figure 4 showing the coupling mechanism fully closed and locked.

Figure 4 illustrates the king pin 19 at proper coupling level with the rear jaw 33 partially closed due to forward movement of the rear and intermediate jaws during a coupling operation, and Figure 5 shows the king pin 19 in proper coupled relationship with its bottom ring or flange 58 beneath the retainer ledge 34 of the intermediate jaw 24 and the lock 50 in locked position engaging the rear jaw at 56. Under these conditions the lug 22 of the intermediate jaw 24 is received within the recess 20 of the front bearing block 2 so that the block 2 and the intermediate jaw 24 are in complementary flat face buffing engagement along surfaces 60 and 62 of the bearing block 2 and intermediate jaw 24 respectively. It may be noted in this connection, as seen in Figure 5, that the king pin 19 is disposed in buffing engagement with the front jaw 18 and the intermediate jaw 24, and since these parts are in buffing engagement with each other as at 60 and 62, they function as a unit to transmit buffing forces to the buffer block 6.

I claim:

1. In a fifth wheel coupling mechanism for a king pin; the combination of a resiliently mounted front jaw, pivotally interconnected intermediate and rear jaws having lateral extensions received within guide slots of said fifth wheel for unitary translatory movement of said intermediate and rear jaws to closed and open position with respect to said pin, said rear and intermediate jaws in open position thereof accommodating entry of said pin during coupling of the latter with said mechanism, means on said intermediate jaw for preventing entry of said pin between said front and intermediate jaws, and means for releasably locking said rear and intermediate jaws in closed position thereof.

2. A fifth wheel coupling mechanism according to claim 1, wherein the first mentioned means are characterized by a lug on the intermediate jaw disposed forwardly and below the front jaw in closed position of said intermediate and rear jaws, said lug preventing entry of the king pin between the front and intermediate jaws when the intermediate and rear jaws are in fully open position.

3. A fifth wheel coupling mechanism according to claim 1, wherein the front jaw is formed on a member in buffing engagement with the intermediate jaw when the rear jaw is in fully closed position.

4. In a fifth wheel coupling mechanism for a king pin having a retainer flange; the combination of a resilient buffer block seated against a front wall of the fifth wheel, a bearing block having a lug recessed in said buffing block, said bearing block presenting a rearwardly facing front jaw and having a recess beneath said jaw, hinged intermediate and rear jaws having ledges received within guide slots of the fifth wheel, said intermediate jaw having a lug disposed closer to the front jaw than the diameter of said flange when the rear jaw is in fully open position, said lug being received within the recess when the intermediate and rear jaws are in closed position, said rear and intermediate jaws in open position thereof accommodating reception of said king pin therebetween during coupling of the pin with said mechanism, and means for releasably locking the intermediate and rear jaws in closed position.

5. A fifth wheel coupling mechanism according to claim 4, wherein the bearing block is provided with a rearwardly facing buffing surface and the intermediate jaw is provided with a forwardly facing buffing surface engageable with the first mentioned surface when the intermediate and rear jaws are in closed position.

6. A fifth wheel coupling mechanism according to claim 4, wherein the bearing block lug is engageable with the front wall to limit compression of the buffing block by said bearing block.

7. A fifth wheel coupling mechanism according to claim 4, wherein the bearing block is provided with lateral extending lugs engageable with the underside of the fifth wheel to position the bearing block relative thereto.

8. In a fifth wheel coupling mechanism for a king pin; the combination of an arcuate front jaw engageable with the king pin, intermediate and rear jaws pivotally interconnected and mounted for translatory movement as a unit, laterally extending ledges on said intermediate and rear jaws guidably received within slots of the fifth wheel for movement toward the front jaw to closed position of the rear jaw, and for movement away from the front jaw to open position of the rear jaw, said rear and intermediate jaws in open position thereof accommodating reception of said pin therebetween during coupling of the pin with said mechanism, and means on the intermediate jaw for preventing entrance of the king pin between the intermediate and front jaws.

9. In a fifth wheel coupling mechanism for a king pin; the combination of a rearwardly facing front jaw, a rearwardly facing intermediate jaw, a forwardly facing rear jaw hingedly connected to the intermediate jaw, guide means on the fifth wheel and on the intermediate and rear jaws for accommodating translatory movement of the intermediate and rear jaws as a unit toward the front jaw to closed position of the rear jaw and away from the front jaw to open position of the rear jaw, said rear and intermediate jaws in open position thereof accommodating reception of an associated king pin therebetween, said pin being embraced by all of said jaws when the rear jaw is in its closed position, and readily releasable means for locking the rear jaw in closed position thereof, wherein the front jaw is formed on a block having a recess beneath said jaw, and wherein the intermediate jaw is provided with a forwardly extending projection disposed closer to the front jaw than the bottom diameter of the king pin when said intermediate and rear jaws are in open position, said projection being disposed within the recess when the intermediate and rear jaws are in closed position.

10. In a fifth wheel coupling mechanism for a king pin having a retainer flange; the combination of a resilient buffer block within a pocket of the fifth wheel, a front jaw supported by said buffer block, hinged intermediate and rear jaws having lateral extensions received within guide slots of said fifth wheel, a retainer ledge on said intermediate jaw for overlapping said flange when the intermediate and rear jaws are in closed position, the space between the intermediate and front jaws being less than the diameter of said flange when the intermediate and rear jaws are in fully open position, said rear and intermediate jaws adapted to receive said king pin therebetween, and readily releasable means carried by said fifth wheel for releasably locking the intermediate and rear jaws in closed position thereof.

11. In a fifth wheel coupling mechanism for a king pin; the combination of a resilient mass of buffing material within a pocket of said fifth wheel, a front jaw having a lug in said mass, hinged intermediate and rear jaws having laterally extending ledges received within guide slots of said fifth wheel for unitary translatory movement of said intermediate and rear jaws, said rear and intermediate jaws adapted to receive the king pin therebetween, said front and intermediate jaws having complementary buffing surfaces in engagement with each other when the rear jaw is in closed position thereof, means on said intermediate jaw for preventing entry of said king pin between said front jaw and said intermediate jaw, and means carried by the fifth wheel for releasably locking the rear jaw in said closed position thereof.

12. In a fifth wheel coupling mechanism for a king pin having a retainer flange; the combination of a mass of resilient buffing material within a pocket of said fifth wheel, a block in said pocket having a forwardly facing buffing surface engageable with said mass, said block having a rearwardly facing front jaw, hinged intermediate and rear jaws having laterally extending ledges received within guide slots of the fifth wheel, said intermediate jaw having a rearwardly extending retainer ledge for engagement with said flange to limit upward movement of the king pin when the rear jaw is in closed position thereof, said rear and intermediate jaws adapted to receive the king pin therebetween, all of said jaws being engageable with the pin when the rear jaw is in closed position thereof, and means carried by the fifth wheel for releasably locking the rear jaw in its closed position, the distance between the intermediate jaw and front jaw being less than the diameter of said flange when the rear jaw is in fully open position.

13. A coupling mechanism according to claim 12, wherein the block is provided with a rearwardly facing buffing surface beneath the front jaw and the intermediate jaw is provided with a forwardly facing buffing surface engaged with said rearwardly facing buffing surface when the rear jaw is in closed position, whereby buffing forces on the front and intermediate jaws are transmitted to the mass of resilient buffing material by the forwardly facing buffing surface of the block.

14. In a fifth wheel coupling mechanism; the combination of a front jaw resiliently supported by said fifth wheel, intermediate and rear jaws pivotally interconnected to each other and mounted for translatory movement as a unit to open and closed positions of said rear jaw, said front and intermediate jaws being adapted to prevent entry of the king pin therebetween, said intermediate and rear jaws being adapted to receive an associated king pin therebetween, all of said jaws being engageable with the pin in closed position of said rear jaw, and means for locking said rear jaw in closed position.

15. In a fifth wheel coupling mechanism; the combination of a front jaw resiliently supported by said fifth wheel, intermediate and rear jaws pivotally interconnected and mounted for translatory movement as a unit, said intermediate and rear jaws being adapted to receive an associated king pin therebetween and having laterally extending guide ledges supported by ledges of said fifth wheel, all of said jaws being engageable with the pin in closed position of the rear jaw, said front jaw and said intermediate jaw being spaced from each other a distance less than the diameter of said king pin, and means carried by the fifth wheel for releasably locking the rear jaw in closed position.

16. In a fifth wheel coupling mechanism; the combination of a front jaw facing rearwardly for engagement with an associated king pin, hinged intermediate and rear jaws adapted to receive said pin therebetween, all of said jaws being engageable with the pin when the rear jaw is in closed poistion thereof, said front and intermediate jaws being adapted to prevent the entry of said king pin therebetween, the rear jaw facing forwardly and the intermediate jaw facing rearwardly for engagement with said king pin, and guide means on said fifth wheel for hinging the rear jaw upwardly to closed position during translatory movement of the intermediate and rear jaws toward the front jaw and for hinging the rear jaw to open position during translatory movement of the rear and intermediate jaws away from the front jaw.

17. In a fifth wheel coupling mechanism for a king pin; the combination of a rearwardly facing resiliently mounted front jaw and pivotally interconnected intermediate and rear jaws adapted to receive an associated king pin therebetween and movable toward and away from the front jaw, said front and intermediate jaws being at all times spaced from each other at a distance less than the diameter of the king pin.

18. In a fifth wheel coupling mechanism; the combination of a resiliently mounted block having a rearwardly facing surface for engagement with an associated king pin and pivotally interconnected jaws adapted to receive said pin therebetween and movable toward and away from said block for confining and releasing said pin, respectively, lug means on one of said jaws operative to prevent the entry of said king pin between said block and said one jaw, said one jaw being engageable with the block when the jaws are in closed position relative to the pin.

19. A fifth wheel coupling arrangement for a king pin comprising, in combination: a resiliently mounted front jaw, movably interconnected intermediate and rear jaws having extensions received within guide slots of said fifth wheel for unitary translatory movement of said intermediate and rear jaws to closed and open position with respect to said pin, said rear and intermediate jaws in open position thereof accommodating entry of said pin therebetween, means on said intermediate jaw for preventing entry of said pin between said intermediate jaw and said front jaw, and means for retaining said rear and intermediate jaws in closed position.

20. A fifth wheel coupling arrangement for a king pin comprising, in combination: a front jaw engageable with the king pin, an intermediate jaw engageable with the king pin, means on one of said jaws to prevent entry of said king pin therebetween, a rear jaw movably connected to said intermediate jaw for movement therewith as a unit, guide lug means on said intermediate and rear jaws received within slots of the fifth wheel for movement toward the front jaw to closed position of the rear jaw and for movement away from the front jaw to open position of the rear jaw, said rear and intermediate jaws in open position accommodating reception of said pin therebetween during coupling of said pin with said arrangement.

References Cited in the file of this patent

UNITED STATES PATENTS

| | | |
|---|---|---|
| 2,015,313 | Kinne | Sept. 24, 1935 |
| 2,610,862 | Braunberger | Sept. 16, 1952 |
| 2,621,056 | Kayler | Dec. 9, 1952 |
| 2,644,693 | Geddert | July 7, 1953 |